United States Patent [19]

Sordello et al.

[11] 4,184,108
[45] Jan. 15, 1980

[54] SELF-REGULATING ELECTRONIC TACHOMETER

[75] Inventors: Frank J. Sordello, Los Gatos; James J. Touchton, Santa Clara, both of Calif.

[73] Assignee: Sperry Rand Corporation, New York, N.Y.

[21] Appl. No.: 854,299

[22] Filed: Nov. 23, 1977

[51] Int. Cl.² ............................................. G05B 5/01
[52] U.S. Cl. ................................. 318/618; 318/594; 318/603
[58] Field of Search ............... 318/561, 603, 618, 617, 318/615, 594

[56] References Cited

U.S. PATENT DOCUMENTS 4,006,394   2/1977   Cuda et al. ..................... 318/603 X Primary Examiner—B. Dobeck
Attorney, Agent, or Firm—Eugene T. Battjer; Marshall M. Truex; William E. Cleaver

[57] ABSTRACT

An electronic tachometer comprising an integrator having its output coupled to a variable gain amplifier and responsive to an input signal representative of the acceleration of a moveable load, such as a head assembly of a disk drive, for producing a coarse velocity signal at the output of the variable gain amplifier indicative of the load velocity, a tachometer gain correction circuit including another integrator coupled to receive the coarse velocity signal to produce a coarse distance signal indicative of distance traveled by the load and means for combining the coarse distance signal with a reference distance signal to produce a distance error signal which functions to adjust the gain of the variable gain amplifier so as to vary the coarse velocity signal to make the coarse distance signal equal to the reference distance signal, and accumulative error compensation means coupled to receive a gain indicative signal derived from the distance error signal to produce a signal input to the tachometer integrator which compensates for accumulative error in the tachometer output, whereby the tachometer accurately indicates load velocity.

31 Claims, 3 Drawing Figures

SELF-REGULATING ELECTRONIC TACHOMETER

BACKGROUND OF THE INVENTION

1. Field of Invention

This invention relates to an electronic tachometer and associated automatic speed control apparatus which is particularly useful in magnetic disk drive data storage devices of the kind now commonly used in electronic data processing systems and is described herein with reference to such a device.

2. Description of Prior Art

As is well known to those skilled in the art, a disk drive typically comprises a disk pack consisting of a plurality of magnetic recording disks each having a multiplicity of concentric recording tracks and being mounted on a drive spindle in stacked slightly spaced relation to one another for common rotation about the spindle. The disk drive further comprises an array of magnetic heads disposed in read/write relation with the disks. In the case of moveable head drives, the heads are mounted on an actuator driven carriage mechanism with at least one head operatively associated with each magnetic surface.

In some earlier disk drives, head position was determined by means of apparatus which included an optical grating mounted for movement with the carriage mechanism and operating in combination with a light source and associated light detector fixedly positioned to each side of the grating. As the grating moved with the carriage mechanism the light passing through the grating was modulated and the distance traveled by the head determined by detecting the modulated light, thereby providing an accurate indication of head position relative to the tracks on the disks. The head velocity was then determined by differentiating the head change of position signal. An example of such a head positioning system is disclosed in U.S. Pat. No. 3,597,750, Servo with AGC for Positioning a Magnetic Head, issued Aug. 3, 1971. Unfortunately, the velocity signal obtained with this system, though accurate was not continuous.

A continuous indication of head velocity has been provided by apparatus of the type disclosed in U.S. Pat. No. 3,568,059, Electronic Tachometer, issued Mar. 2, 1971. That tachometer provides a continuous indication of head velocity by integrating the current applied to the actuator which drives the carriage mechanism. It was recognized, however, that the actuator drive current was not totally accurate for indicating head velocity because of variations in wind resistance and friction associated with the carriage mechanism and other such factors. Therefore, the velocity signal obtained by integration of the actuator current had to be corrected periodically in order to obtain an accurate indication of head velocity. Such correction was provided by periodically adjusting the continuous actuator derived velocity signal to the value of a discontinuous but accurate velocity signal obtained by differentiation of a distance signal derived from an optical grating.

Other electronic tachometers incorporating optical grating apparatus for providing position and velocity information are known in the art and indeed are capable of providing a continuous velocity indication. A tachometer of this type is disclosed in U.S. Pat. No. 3,811,091, issued May 14, 1974. In any event, in presently used disk drives the optical grating is eliminated by the provision of position control servo data recorded directly on the magnetic disks. This reduces the cost of the disk drive and facilitates interchanging of the disk packs without concern for extremely precise positioning of the pack as is required with a grating apparatus because the position of the heads is referenced directly to the disks. Position control by use of such servo data may be achieved, for example, by a servo head which is operatively associated with one of the magnetic surfaces and affixed to the carriage mechanism to move in unison with data heads associated with the other magnetic surfaces of the disk pack. As the actuator mechanism moves the array of heads across the disk surfaces, the servo head responds to the servo data to produce a change of position or distance signal which is used for controlling the motion of the heads to locate a selected head adjacent a desired track of its associated disk. This distance signal, however, is not as accurate as the distance signal provided by a grating system and as a result a velocity signal derived therefrom is not accurate to the degree desired for high track density disk drives. More specifically, the distance signal obtained by detecting recorded servo data is usually truncated in shape or otherwise distorted so as not to have a constant amplitude, much less a predictable waveform. Since the velocity signal is generated by differentiating the distance signal, any change in the shape of such signal results in a change in its slope and thus provides an erroneous velocity signal. Changes in the slope of the distance signal can be caused, among other things, by variations in the amplitude of the recorded servo signal, variations in the coercivity of the magnetic recording surface and variations in the head flying height relative to the magnetic surface. The accuracy of the velocity signal is also affected by defects in the recording media and by the wider band width and higher slew rate required of the distance detecting and differentiating circuits used in high track density devices. Media defects, for instance, produce noise in the detected distance signal and in the case of high track densities may result in complete obliteration of certain tracks with a resultant substantial increase in noise and degradation of signal to noise ratio. Moreover, media defects adversely affect a velocity signal obtained by differentiation of a distance signal derived from recorded servo data because such defects are characterized by high frequency components which are accentuated by the differentiation process. The slew rate and band width of the differentiator circuit have a deleterious affect on the signal to noise ratio in high track density devices because the frequency of the distance signal obtained by detection of the servo data is proportional to the rate at which the head traverses the tracks which in turn is dependent on the track density.

The foregoing and other disadvantages and limitations of electronic tachometers presently used in high track density disk drives are overcome by the present invention as will become apparent from the description provided hereinafter, particularly of the preferred embodiment given with reference to the appended drawings.

SUMMARY OF THE INVENTION

It is a principal object of the present invention to provide a new and improved electronic tachometer and speed control apparatus in which the tachometer can be used for accurately controlling the velocity of a moveable load.

Another object of the invention is to provide a new and improved electronic tachometer which provides a continuous and accurate indication of the velocity of a moveable load.

A further object of the invention is to provide a new and improved electronic tachometer which is particularly adapted for use in high track density disk drive devices.

The foregoing and other objects of the invention are carried out by the provision of an electronic tachometer which comprises means responsive to changes in the velocity of a magnetic head for producing a coarse velocity signal indication of the head motion and further means coupled to receive the coarse velocity signal for producing a coarse distance signal indicative of distance traveled by the head. Additional means serves to compare the coarse distance signal with a reference signal representative of actual distance traveled by the head. Any difference between the reference and coarse distance signals produces an error signal which is used to regulate the means producing the coarse velocity signal so that the coarse distance signal derived therefrom becomes equal to the reference distance signal, whereby the coarse velocity signal accurately indicates the actual head velocity. Finally, still further means is coupled to receive the error signal to produce a compensating signal which compensates for any low frequency or long term accumulative error of the coarse velocity signal producing means. More specifically, in a preferred embodiment of the invention an electronic tachometer provides the coarse velocity signal indication by integrating the energizing current applied to a head actuator mechanism, such current being representative of the head acceleration and therefore providing velocity information when integrated. The coarse velocity signal is then integrated to provide the coarse distance signal which is algebraically summed with the reference distance signal to produce a distance error signal. The distance error signal is sampled and reset recurrently at known distance increments of head travel. Each sample of the distance error signal acts through a comparator to produce a gain indicative signal which varies until it becomes equal to the distance error signal. The gain indicative signal is representative of the gain of the electronic tachometer which is gain adjusted to vary the coarse velocity signal so that the coarse distance signal becomes equal to the reference distance signal. The gain indicative signal is also summed with the coarse and reference distance signals whereby each instantaneous sampled value of the distance error signal is referenced to the preceding value of the gain indicative signal so that in essence the instantaneous value of the distance error signal is actually representative of an instantaneous desired gain signal. Each successive value of the gain indicative signal is also compared with a selected initial value thereof to produce an accumulative error compensating signal which compensates for accumulative error of the tachometer so as to maintain its quiescent output near the center of the dynamic operating range and thus further assure against error in the tachometer velocity indication.

DESCRIPTION OF THE PREFERRED EMBODIMENT

Figure 1:
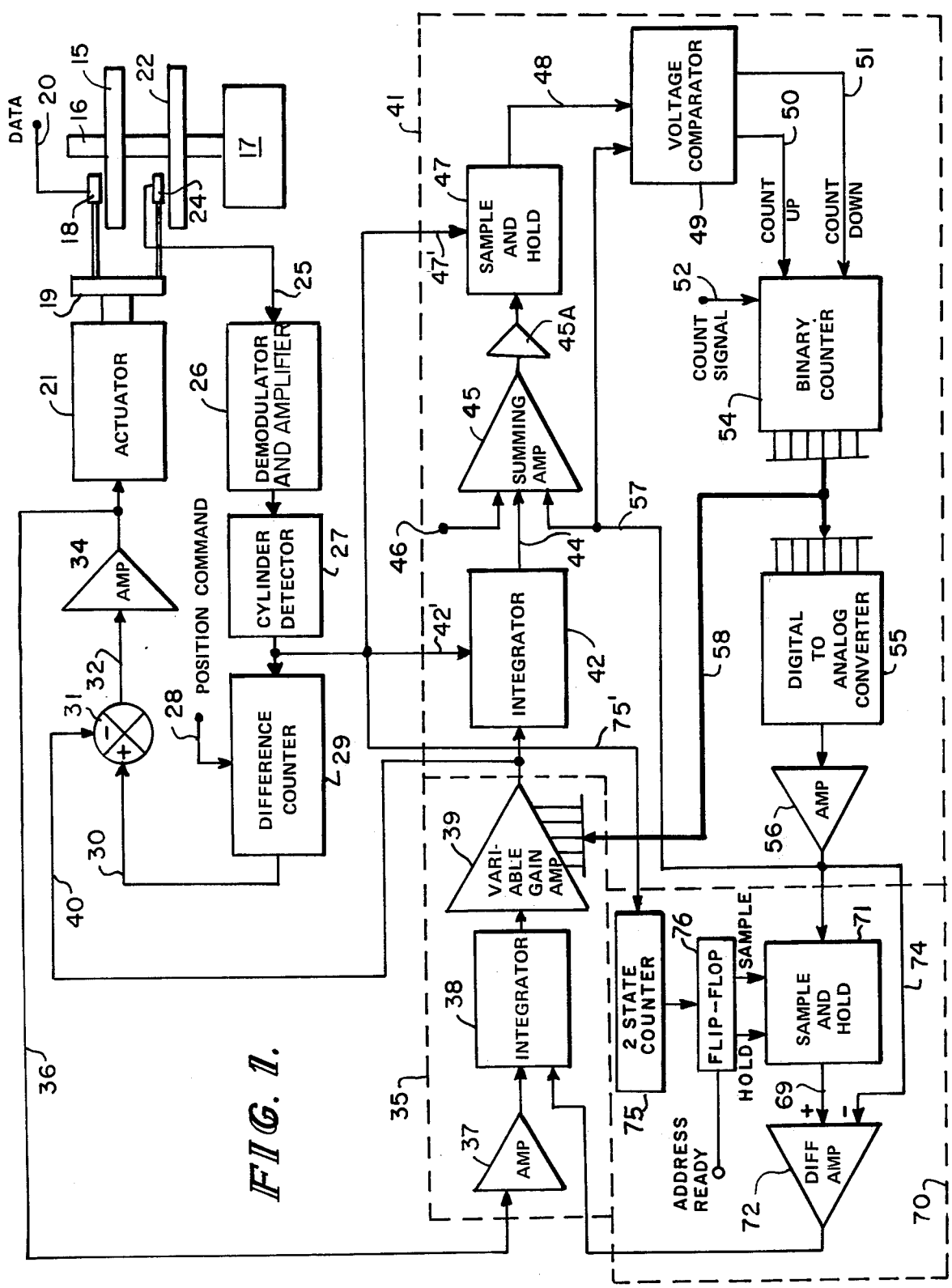
FIG. 1 is a block diagram of a disc drive apparatus incorporating the present invention.

Referring to FIG. 1, information is recorded on rotating, magnetically coated disk 15 supported on spindle 16 which is driven by spinner motor 17. The information is recorded and read back by read/write data head 18 supported on carriage 19, with the data being transmitted through conductor 20. In a seek operation, carriage 19 is controllably moved by electrical energization applied to actuator 21 coupled to the carriage so as to move the data head across the disk for accessing concentrically disposed data tracks on the disk surface. Position control of the data head is accomplished by means of servo data prerecorded on the concentric tracks of magnetically coated servo disk surface 22 which is also fixed to spindle 16. The prerecorded servo data is detected by servo head 24 fixed to carriage 19 and serves to regulate the energization of actuator 21 so that the servo head 24 and data head 18 move in unison substantially radially of the disks to position the heads at a desired data track. Although only one data head is shown, in fact many may be fixed for simultaneous movement by the one actuator, each being associated with a corresponding recording disk surface. Corresponding tracks which align vertically on other disks positioned on the same spindle are referred to as cylinder positions.

The servo signals detected by servo head 24 are transmitted through conductor 25 to amplifier and demodulator 26 which can be of the type disclosed in U.S. patent application Ser. No. 713,133, Dual Mode Demodulator, filed Aug. 10, 1976 now U.S. Pat. No. 4,092,683 and assigned to the Sperry Rand Corporation. The output signal of the amplifier and demodulator is supplied to cylinder detector 27 which generates a pulse signal each time the servo head is aligned with the center of a track in the course of traveling across the disk surface. For movement of a head from a present position to a desired position, a position command signal is supplied to terminal 28 for application to difference counter 29 which also receives the cylinder detector pulses to generate a position error signal representative of the difference between the instantaneous and desired positions of the head. The position error signal is in turn transmitted through conductor 30 to summing junction 31 and then through conductor 32 to amplifier 34 to energize actuator 21 for moving the head to the desired position. Thus, position control is provided by varying the amplitude of the actuator energization in accordance with the proximity of the head to the desired position. In order to attain efficient motion of the heads, however, for the purpose of accurately and rapidly accessing a desired track, velocity control must also be introduced. In other words, if the head is close to the desired position, the actuator velocity must be maintained at a low maximum value so as not to overrun the desired position. On the other hand, it is important to move the head at the greatest possible velocity while still maintaining the ability to stop the head upon arrival at the desired position.

In accordance with the present invention, a coarse head velocity signal is generated by tachometer 35 comprising amplifier 37, integrator 38 and variable gain amplifier 39. The coarse velocity signal is derived from the actuator energizing current provided at the output of amplifier 34 and transmitted through conductor 36 to the input of the tachometer. Since the actuator energizing current is an indication of the actuator force and that force is proportional to acceleration, integration of the actuator current renders a signal generally representative of head velocity. The coarse velocity signal provided at the tachometer output is transmitted through conductor 40 to junction 31 as a velocity control input for generation of the actuator energizing signal.

The tachometer output signal is only a coarse indication of head velocity because of variables in the disk drive system which cause changes in the velocity of the heads unrelated to changes in the actuator energizing current. Such variables include, for example, changes in friction and wind resistance and changes in the force constant of the actuator, all of which affect the efficiency at which the heads are moved in response to a given energizing signal. Notwithstanding these limitations, however, the actuator energizing signal has the very desirable attribute of allowing for derivation of a continuous velocity signal, thereby enabling the determination of head velocity not only at track crossings but also intermediate crossing tracks positions, which is an extremely important consideration in presently used disk drives. The invention permits use of a coarse velocity signal generated in the aforedescribed manner by the provision of means for correcting the velocity signal so that it becomes a very accurate indication of head velocity and thus able to precisely control the motion of the heads. More specifically, the coarse velocity signal out of the tachometer is integrated for a period of time corresponding to travel of the heads between predetermined positions to provide a coarse distance signal to be compared with a reference distance signal for generating a distance error signal which is used to adjust the variable gain of the tachometer amplifier so that the tachometer output signal is made accurately representative of the head velocity.

Gain adjustment of the tachometer is accomplished with the apparatus shown in FIG. 1 by feeding the tachometer output signal to integrator 42 of tachometer gain correction circuit 41. Integration of the velocity signal produces a coarse distance signal at the output of integrator 42 which, in accordance with sample data operation as will be described momentarily, is reset to zero at each track crossing by a signal supplied from cylinder detector 27 via conductor 42'. The coarse distance signal is therefore a velocity derived representation of distance traveled by the heads during the successive time (sample) intervals that the heads move from each track to the next track. A fixed voltage reference distance signal, representative of the distance between adjacent tracks, is supplied to terminal 46 to be algebraically added in summing amplifier 45 with the coarse distance signal supplied thereto on conductor 44. The output signal of summing amplifier 45 thus indicates in amplitude and polarity the difference, that is, the distance error, between the actual head travel and the head travel calculated from the velocity signal supplied by tachometer 35. This output signal is transmitted through inverter 45A to sample and hold circuit 47 which is actuated on the occurrence of each track crossing by a signal supplied from cylinder detector 27 on conductor 47' such that sampling is performed immediately before integrator 42 is reset to zero. Sample and hold circuit 47 functions to hold the sampled distance error signals for the respective track to track time intervals and its output in turn is coupled through conductor 48 to voltage comparator 49. Depending upon whether the reference distance signal at terminal 46 is less or greater than the coarse distance signal provided at the output of integrator 42, the voltage comparator will generate either a countup signal to be transmitted through conductor 50 or a countdown signal to be transmitted through conductor 51 to binary counter 54. The binary counter responds to the countup and countdown signals to count at a repetition rate corresponding to a count signal, which can be a signal from a write oscillator or the like received at terminal 52, and thus supplies a resultant count signal which acts by way of conductors 58 to adjust the gain of tachometer 35 as will be explained a little later in greater detail. The resultant count signal is in essence a gain indicative signal which is converted to analog form by transmission through digital to analog converter 55 and then coupled through amplifier 56 and conductor 57 to the other input of voltage comparator 49 for comparison with the sampled distance error signal on conductor 48. The countup or countdown signal from the voltage comparator continues until the input to the voltage comparator on conductor 57 equals the sampled distance error signal, at which instant the count stops and the gain indicative signal is representative of the present or instantaneous value of the tachometer gain until the next sampling instant. The gain indicative signal is also applied via conductor 57 as a third input to summing amplifier 45. It will be appreciated therefore, that if the tachometer gain has been adjusted correctly so as to make the coarse distance signal out of integrator 42 at the next sampling instant equal to the reference distance signal at terminal 46, then the gain indicative signal feeding through summing amplifier 45 and inverter 45A will act, when sampled, to supply a signal on conductor 48 to cancel the gain indicative signal on the other input to voltage comparator 49. Under such condition the gain indicative signal will remain unchanged as indeed is appropriate once the tachometer gain has been correctly adjusted. On the other hand, if the present gain adjustment is not correct, the value of the coarse distance signal out of integrator 42 will be different from the reference distance signal on terminal 46 and a new value of gain indicative signal, and corresponding gain adjustment, will be provided after the next sampling instant. Operation of tachometer gain correction circuit 41 continues in the aforedescribed manner for each track to track interval until the head reaches the desired track. From the foregoing comments it will be apparent that the present value of the signal on conductor 48 is representative of the instantaneous desired gain, that is, the gain desired from the instant of sampling until the occurence of the next sample, or stated somewhat differently, the present value of the signal on conductor 48 is representative of the instantaneous value of distance error referenced to or based on the preceding value of the gain indicative signal.

At the same time that the tachometer gain correction circuit is functioning as described above, a digital representation of the gain indicative signal provided at the output of binary counter 54 is transmitted through conductors 58 to adjust the gain of variable gain amplifier 39 in tachometer 35. The gain of the tachometer is adjusted in accordance with the value of the gain indicative signal to render a subsequent sampled value of the coarse distance signal from integrator 42 equal to or at least closer in value to the reference distance signal. When these signals are equalized the velocity signal generated by the tachometer is a correct indication of head velocity. Thus, at each cylinder crossing a checking and readjustment of the tachometer gain is provided as necessary to obtain an accurate velocity output signal from the tachometer.

Figure 2:
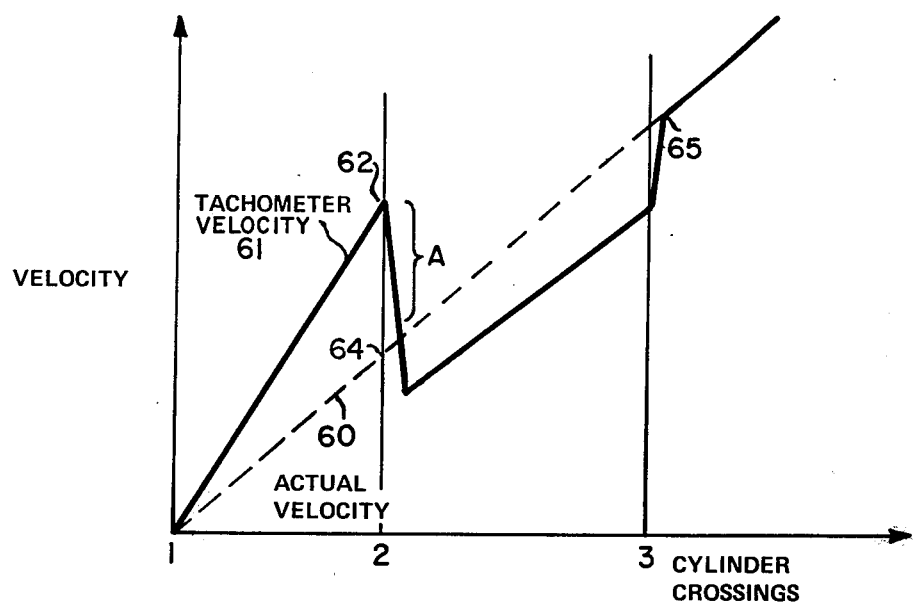
FIG. 2 is a graphic illustration of one manner in which the gain of the tachometer incorporated in the apparatus of FIG. 1 is corrected.

FIG. 2 is an illustration of the correction effected in the tachometer gain at successive track or cylinder crossings. Dotted line 60 represents the actual velocity of the head and solid line 61 represents the tachometer velocity signal, that is, the velocity signal generated by integration of the actuator energizing signal starting from a first cylinder crossing. At cylinder crossing 2, the tachometer velocity signal is shown to be high as indicated by the difference A between the velocity at point 62 and the actual head velocity at point 64. Adjustment of the tachometer gain at or shortly after the second cylinder crossing, as explained hereinbefore with reference to FIG. 1, lowers the indicated velocity so that it is within a few percent of the actual head velocity from cylinder crossing 2 to cylinder crossing 3. At cylinder crossing 3 the tachometer gain is adjusted again, this time setting the indicated velocity to the value at point 65 so that the tachometer velocity signal is made equal or at least almost equal to the actual head velocity. Thereafter, the indicated velocity may deviate gradually above or below the actual velocity until the next sampling instant (cylinder crossing) when it is again made accurate. Such adjustment is provided at each cylinder crossing during a seek operation thereby maintaining the tachometer velocity signal very closely representative of the actual head velocity. In general, the gain adjustments will correct the indicated velocity to the value of actual velocity within a few samples from the beginning of a seek. Initial errors in the gain adjustment on the first samples occur as a result of the velocity being corrected on a percentage basis equal to the percentage error of the distance error signal. In other words, if the distance error is, say, ten percent high, then the velocity error is reduced by ten percent.

In the preceding paragraphs it has been explained how gain adjustment of the tachometer is provided to correct for various dynamic factors which affect the accuracy of the tachometer output signal. The gain adjustment occurs at comparatively high frequency as determined by the sampling rate which varies in accordance with the rate at which the heads traverse the cylinders. Thus, at the beginning of a seek the sampling rate is low and increases as the velocity increases to a point generally about midway between the initial and desired positions, after which the velocity and sampling rate progressively decrease until the desired position is reached. In addition to this high frequency variable rate gain adjustment, the invention also provides a relatively lower frequency accumulative error compensation which compensates for error in the tachometer output resulting from factors such as low frequency variations in the force constant of the actuator and wind resistance and friction forces acting on the moveable elements of the head assembly as well as drift of the tachometer integrator due to temperature and other effects. The nature of the accumulative error compensation will first be described with reference to FIG. 3 and then with reference to FIG. 1 to explain how such compensation is implemented in apparatus.

Figure 3:
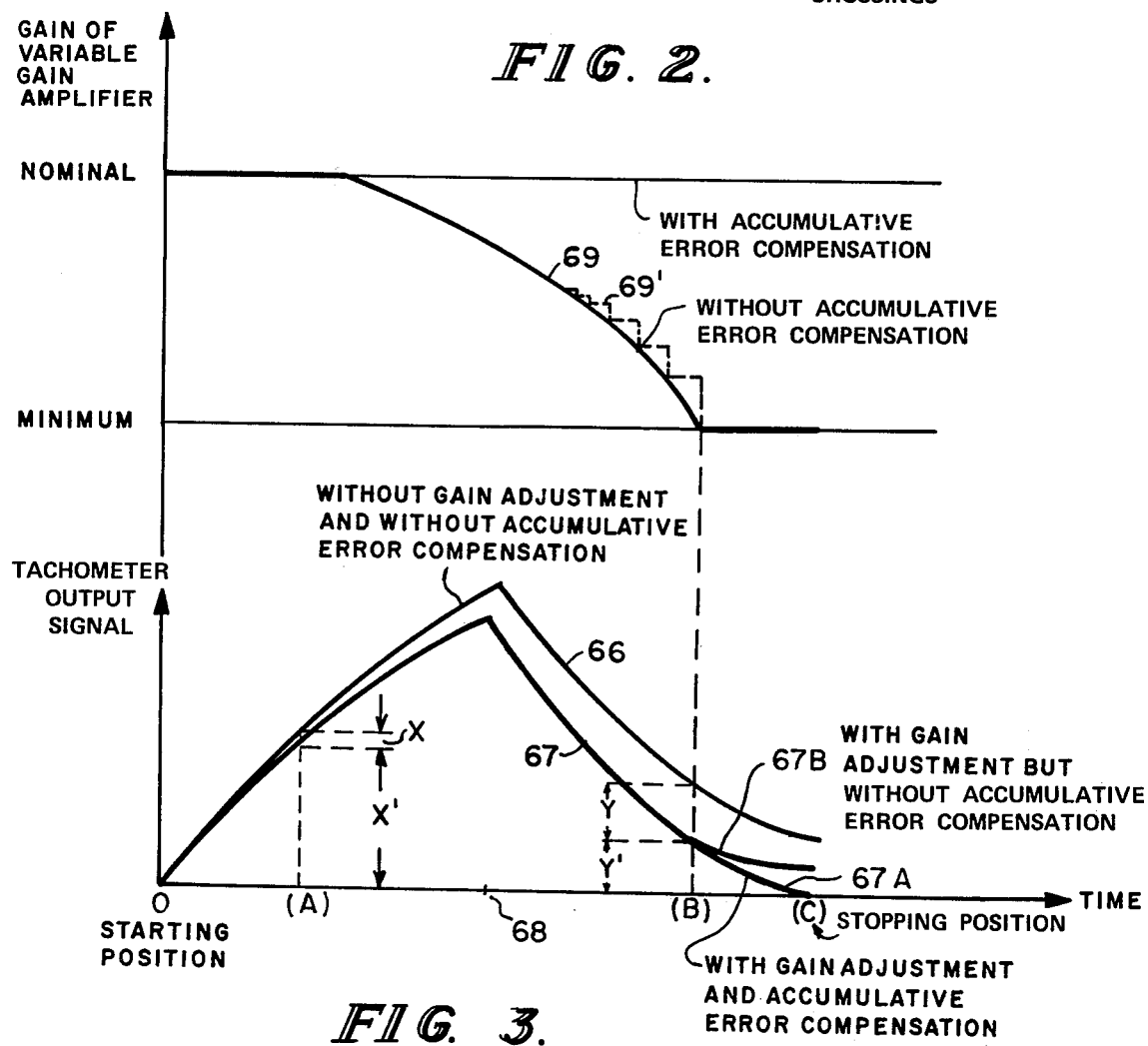
FIG. 3 depicts representative waveforms of the accumulative error compensation provided by the apparatus of FIG. 1.

Waveform 67, 67A of FIG. 3 represents an actual head velocity signal as a function of time as the head moves from a starting position to a stopping position. Waveform 66 is illustrative of a corresponding tachometer output signal which may occur as the head moves from the starting position to the stopping position under a condition where neither sampled gain adjustment or accumulative error compensation is provided. As indicated by the divergence of waveforms 66 and 67, the error of the velocity signal continuously increases if no error correction whatsoever is provided. For instance, at position A the velocity error is represented by the increment X between the actual velocity waveform 67 and the tachometer velocity waveform 66. At or near the midposition 68, deceleration of the heads is initiated as described in U.S. Pat. No. 3,631,443, Unsafe Velocity Detection System, issued Dec. 28, 1971, but the velocity error still increases, however, and at position B is represented by the increment Y. Thus, the amount of error correction required to correct the tachometer signal at position A is approximately one tenth of the total signal output X+X'. At position B though, the required error correction is a much larger percentage of the total signal output Y+Y'. For practical reasons relating to cost and availability of circuit components it is not feasible to provide such a large degree of error correction, as is required at position B, simply by adjusting the gain of the tachometer variable gain amplifier. In fact, under such constraints, the dynamic operating range or range of gain variation that can be tolerated for the tachometer variable gain amplifier 39 and digital to analog converter 55 used in the apparatus of FIG. 1 will typically be limited to about plus or minus fifty percent from a nominal value. Consequently, if gain adjustment is the only error correction provided, the tachometer signal will indeed be corrected from the starting position to position B, but thereafter until the stopping position C the tachometer velocity (waveform 67B) will diverge from the actual velocity (waveform 67A). This can be more fully understood by reference to waveforms 69 and 69'. Waveform 69 illustrates the gain of the tachometer variable gain amplifier on a continuous basis. At the starting position, various static errors resulting from such factors as variations in the integrator gain and the force constant of the actuator will be corrected at the first sample and the gain of the variable gain amplifier set to a nominal value reasonably close to the true nominal value that would be obtained if no static errors existed and preferably displaced therefrom by no more than one half of the dynamic operating range. Then as the seek operation continues the gain will be adjusted at a continuously increasing rate until position B is reached where the full dynamic range of the variable gain amplifier has been used and no further gain adjustment can be provided, with the result that the gain is limited to the indicated minimum value. Actually, the gain follows sampling waveform 69' which shows that successive samples are closely spaced at the midposition where the velocity is greatest and spaced further apart as the stopping position is approached where the velocity is proportionately diminished. It is thus seen that the required gain adjustment without accumulative error compensation becomes increasingly greater near the end of the seek because the sampling intervals are increasing and the accumulative error has built up to an appreciable value for which gain adjustment alone can no longer provide the desired correction. By the provision of accumulative error compensation, however, the gain of the variable gain amplifier is maintained farily constant, except possibly for some variation required to correct for variations in the force constant of the actuator occurring over its range of motion, but in any event not exceeding the dynamic operating range of the variable gain amplifier.

Referring now to FIG. 1, accumulative error compensation is provided by means of accumulative error compensator 70 which compensates for errors in the output signal of integrator 38 to relieve amplifier 39 of the need to further adjust the gain of the circuit to compensate for accumulated error. In the presently preferred mode of operation the compensation for accumulative error at the output of integrator 38 is provided by sampling and holding the gain indicative signal supplied from amplifier 56 at the occurrence of the second track crossing after the start of a seek operation, and then comparing each successive value of the gain indicative signal with the held value until the desired track is reached. More specifically, at the occurrence of the first track crossing after the start of a seek operation, the gain indicative signal supplied at the output of amplifier 56 is fed through the parallel paths of lead 74 and sample and hold 71 to the input of differential amplifier 72. At that instant no signal output is provided by amplifier 72. The operation is the same at the occurrence of the second track crossing after start of the seek operation except that immediately thereafter sample and hold 71 no longer samples the gain indicative signal but simply holds the value sampled at the second track crossing. Switching of sample and hold 71 in this manner is carried out by two state counter 75 which is coupled to receive track crossing pulses from cylinder detector 27 via conductor 75' and provide a trigger signal to bistable flip flop 76. At the count of two, counter 75 provides a signal which switches flip flop 76 to place sample and hold 71 in a hold mode until the completion of the seek action whereupon an access ready signal resets flip flop 76 and sample and hold 71 returns to a sample mode in readiness for the next seek operation. In this manner an accumulative error compensating signal proportional to the difference between the held value of the gain indicative signal and each successive value thereof is provided at the output of amplifier 72. This accumulative error compensating signal is applied to integrator 38 with a gain, relative to the integrator gain for the actuator signal supplied thereto by way of lead 36, sufficient to correct for low frequency error at the output of integrator 38 caused by integrator drift and other low frequency accumulative error producing forces such as head lead drag forces and windage.

Thus in the manner described, there is provided both a tachometer gain correction circuit for the generation of a gain adjustment signal to correct the tachometer velocity output signal, and an accumulative error compensation circuit to enable the tachometer amplifier to operate within and preferably at or near the midpoint of its dynamic range.

While a preferred embodiment of the invention has been described in specific detail, it will be understood that various modifications and substitutions may be made therein without departing from the spirit and scope of the invention as defined in the appended claims.

We claim:

1. In apparatus having a load driven by an actuator for moving the load from a present position to a desired position at desired velocity and including means for receiving an input command signal for driving the load, transducer means coupled to the load for providing a feedback signal indicative of the motion of the load, and means for combining the input command and feedback signals to produce a control signal for application to the actuator to control the load to move at desired velocity, the improvement comprising:

means operatively associated with the load for producing a coarse velocity signal indicative of the velocity of said load, means including a distance indicating integrator coupled to receive the coarse velocity signal for producing a coarse distance signal which is referenced to a distance signal value representative of actual distance traversed to provide a distance error signal indicative of error in the coarse velocity signal, and means responsive to the distance error signal and coupled to the actuator for changing the control signal applied to the actuator so the load moves at desired velocity irrespective of the error in the coarse velocity signal.

2. The apparatus of claim 1 further comprising additional means responsive to the distance error signal for supplying to the coarse velocity signal producing means an accumulative error compensating signal to compensate for accumulative error in the coarse velocity signal so that said coarse velocity signal producing means is able to operate in its dynamic operating range.

3. The apparatus of claim 1 wherein the means responsive to the distance error signal includes means for producing a signal indicative of the gain of the coarse velocity signal producing means and adjusting the gain of said coarse velocity signal producing means to null the distance error signal.

4. The apparatus of claim 3 wherein the means for producing a signal indicative of the gain of the coarse velocity signal producing means and adjusting the gain thereof includes comparator means for comparing the distance error and gain indicative signals to produce an instantaneous value of the gain indicative signal out of the gain indicative signal producing means.

5. The apparatus of claim 4 wherein the means including a distance indicating integrator also functions for combining the instantaneous value of the gain indicative signal with the distance error signal for application to the comparator means so that the gain of the coarse velocity signal producing means remains constant when the distance error signal is nulled.

6. The apparatus of claim 5 further comprising means coupled to receive the gain indicative signal for supplying to the coarse velocity signal producing means an accumulative error compensating signal to compensate for accumulative error in the coarse velocity signal so that the coarse velocity signal producing means is able to operate in its dynamic operating range.

7. The apparatus of claim 1 wherein the coarse velocity signal is representative of an energizing signal applied to the actuator for controlling the velocity of the load.

8. The apparatus of claim 7 wherein the coarse velocity signal producing means includes variable gain integrator a signal representative of means for integrating the energizing signal applied to the actuator.

9. The apparatus of claim 8 wherein the variable gain integrator means comprises a velocity indicating integrator coupled to the input of a variable gain amplifier which provides the coarse velocity signal at its output.

10. The apparatus of claim 9 wherein the means responsive to the distance error signal includes means for producing a signal indicative of the gain of the variable gain amplifier and adjusting the gain of said variable gain amplifier to null the distance error signal.

11. The apparatus of claim 10 wherein the means for producing a signal indicative of the gain of the variable gain amplifier and adjusting the gain thereof includes comparator means for comparing the distance error and gain indicative signals to produce an instantaneous value of the gain indicative signal.

12. The apparatus of claim 11 wherein the means including a distance indicating integrator also functions for combining the instantaneous value of the gain indicative signal with the distance error signal for application to the comparator means so that the gain of the variable gain amplifier remains constant when the distance error signal is nulled.

13. The apparatus of claim 12 further comprising means coupled to receive the gain indicative signal for supplying to the velocity indicating integrator an accumulative error compensating signal to compensate for accumulative error at the output of said velocity indicating integrator so that the variable gain amplifier is able to operate in its dynamic operating range.

14. The apparatus of claim 13 wherein the accumulative error compensating signal is derived by differentially combining an instantaneous value of the gain indicative signal with a selected initial value thereof.

15. In apparatus having a load driven by an actuator for moving the load from a present position to a desired position at desired velocity and including means for receiving an input command signal for driving the load, transducer means coupled to the load for providing a feedback signal indicative of the motion of the load, and means for combining the input command and feedback signals to produce a control signal for application to the actuator to control the load to move at desired velocity, the improvement comprising:

means including a velocity indicating integrator coupled to the input of a variable gain amplifier for receiving at the input of said velocity indicating integrator a signal indicative of the acceleration of said load to produce a coarse velocity signal at the output of said variable gain amplifier indicative of the velocity of said load, means including a distance indicating integrator coupled to receive the coarse velocity signal for producing a coarse distance signal which is referenced to a distance signal value representative of actual distance traversed by the load to provide a distance error signal indicative of error in the coarse velocity signal, means responsive to the distance error signal for changing the control signal applied to the actuator so the load moves at desired velocity irrespective of the error in the coarse velocity signal, said transducer means coupled to the load being further operative to provide distance marker signals indicative of position increments traversed by the load, said means including a distance indicating integrator being responsive to distance marker signals for resetting said distance indicating integrator to an initial value, said distance signal, value representative of actual distance traversed by the load being representative of distance between distance marker signals, and said means responsive to the distance error signal including sampling means actuatable by the distance marker signal for sampling the distance error signal prior to resetting of said distance indicating integrator and holding each such sampled value until the occurrence of a subsequent marker signal for effectuating the change of the control signal applied to the actuator.

16. The apparatus of claim 15 wherein the means responsive to the distance error signal further includes means coupled to the output of said sampling means for producing a signal indicative of the gain of the variable gain amplifier and adjusting the gain of said variable gain amplifier to null the distance error signal at the output of the means including the distance indicating integrator.

17. The apparatus of claim 16 wherein the means for producing a signal indicative of the gain of the variable gain amplifier and adjusting the gain thereof includes comparator means for comparing the present sampled value of the distance error signal with the instantaneous value of the gain indicative signal for producing said instantaneous gain indicative signal.

18. The apparatus of claim 17 wherein the means including a distance indicating integrator also functions for combining the instantaneous value of the gain indicative signal with the distance error signal for application to the comparator means at the next sampling instant so that the gain of the variable gain amplifier remains constant when the sampled value of the distance error signal is nulled.

19. The apparatus of claim 18 further comprising means coupled to receive the gain indicative signal for supplying to the velocity indicating integrator an accumulative error compensating signal to compensate for accumulative error in the coarse velocity signal so that the variable gain amplifier is able to operate in its dynamic operating range.

20. The apparatus of claim 14 wherein the accumulative error compensating signal is obtained by combining each instantaneous value of the gain indicative signal with a selected initial value thereof.

21. The apparatus of claim 14 wherein the accumulative error compensating signal is obtained by combining each instantaneous value of the gain indicative signal with a prior value thereof.

22. Electronic tachometer apparatus for providing an indication of the velocity of an actuator driven load comprising:

coarse velocity signal producing means operatively associated with the load for producing a signal indicative of the coarse velocity of the load, means including a distance indicating integrator coupled to receive the coarse velocity signal for producing a coarse distance signal which is referenced to a distance signal value representative of actual distance traversed by the load to provide a distance error signal indicative of error in the coarse velocity signal, and means responsive to the distance error signal and coupled to the coarse velocity signal producing means for changing the gain of said coarse velocity signal producing means so as to null the distance error signal.

23. The apparatus of claim 22 further comprising additional means responsive to the distance error signal for supplying an accumulative error compensating signal to the coarse velocity signal producing means to compensate for accumulative error in the coarse velocity signal so that said coarse velocity signal producing means is able to operate in its dynamic operating range.

24. The apparatus of claim 23 wherein the means responsive to the distance error signal includes means for producing a signal which is indicative of the gain of the coarse velocity signal producing means and which is used for adjusting the gain of said coarse velocity signal producing means so as to null the distance error signal.

25. The apparatus of claim 24 wherein the means for producing a signal indicative of the gain of the coarse velocity signal producing means includes comparator means for comparing the distance error and gain indicative signals to produce an instantaneous value of the gain indicative signal, and the means including a distance indicating integrator functions for combining the instantaneous value of the gain indicative signal with the distance error signal for application to the comparator means so that the gain of the coarse velocity signal producing means remains constant when the distance error signal is nulled.

26. The apparatus of claim 23 wherein the coarse velocity signal is derived from an energizing signal applied to the actuator for controlling the velocity of the load.

27. The apparatus of claim 26 wherein the coarse velocity signal producing means comprises a velocity indicating integrator coupled to the input of a variable gain amplifier which provides the coarse velocity signal at its output, the coarse velocity signal is varied by adjusting the gain of said variable gain amplifier, and the accumulative error compensating signal is applied to the input of said velocity indicating integrator with a predetermined gain so as to reduce the accumulative error substantially to zero.

28. Electronic tachometer apparatus for providing an indication of the velocity of an actuator driven load comprising:
    coarse velocity signal producing means coupled to receive a signal representative of energization applied to the actuator for controlling the velocity of the load to produce a coarse velocity signal indicative of the coarse velocity of said load,
    said coarse velocity signal producing means including a velocity indicating integrator coupled to the input of a variable gain amplifier which provides the coarse velocity signal at its output,
    said coarse velocity signal being adjustable by adjustment of the gain of said variable gain amplifier,
    means including a distance indicating integrator coupled to receive the coarse velocity signal for producing a coarse distance signal which is referenced to a distance signal value representative of actual distance traversed by the load to provide a distance error signal indicative of error in the coarse velocity signal,
    means responsive to the distance error signal and coupled to the coarse velocity signal producing means for producing a coarse velocity gain indicative signal which adjusts the gain of said coarse velocity signal producing means so as to null the distance error signal,
    additional means responsive to the distance error signal for supplying an accumulative error compensating signal to the input of said velocity indicating integrator of said coarse velocity signal producing means with a predetermined gain to compensate for accumulative error in the coarse velocity signal such as to reduce the accumulative error substantially to zero so that said coarse velocity signal producing means is able to operate in its dynamic operating range,
    means coupled to the load for providing distance marker signals indicative of position increments traversed by the load,
    said means including a distance indicating integrator being responsive to distance marker signals for resetting said distance indicating integrator to an initial value,
    said distance signal value representative of actual distance traversed by the load being representative of distance between distance maker signals, and
    said means responsive to the distance error signal including sample and hold means actuatable by the distance marker signals for sampling the distance error signal prior to resetting of said distance indicating integrator and holding such sampled value until the occurrence of a subsequent marker signal, the sampling rate being variable as a result of the variable velocity of the load, and the sampled value of the distance error signal being used for adjusting the gain of the variable gain amplifier to null the distance error signal.

29. The apparatus of claim 28 wherein the means responsive to the distance error signal for adjusting the gain of the variable gain amplifier further includes comparator means coupled to receive the sampled value of the distance error signal and coarse velocity gain indicative signal, and counter means coupled to the output of the comparator means for counting at a predetermined rate to produce the coarse velocity gain indicative signal which varies until the comparator output is nulled.

30. The apparatus of claim 29 wherein the accumulative error compensating signal is obtained by combining each instantaneous value of the gain indicative signal with a selected initial value thereof.

31. The apparatus of claim 29 wherein the accumulative error compensating signal is obtained by combining each instantaneous value of the gain indicative signal with a prior value thereof.

* * * * *